United States Patent [19]
Saito et al.

[11] Patent Number: 6,030,679
[45] Date of Patent: Feb. 29, 2000

[54] OPTICAL RECORDING MATERIAL AND ITS FABRICATION METHOD

[75] Inventors: Takao Saito; Hiroshi Shingai; Tatsuya Kato; Hajime Utsunomiya; Katsuaki Yanagiuchi, all of Nagano, Japan

[73] Assignee: TDK Corporation, Tokyo, Japan

[21] Appl. No.: 09/131,864

[22] Filed: Aug. 10, 1998

[30] Foreign Application Priority Data

Aug. 20, 1997 [JP] Japan ..................................... 9-238911

[51] Int. Cl.$^7$ ....................................................... B32B 3/00
[52] U.S. Cl. ..................... 428/64.1; 428/64.4; 428/64.5; 428/698; 428/702; 428/913; 430/270.13; 430/495.1; 430/945; 369/283; 369/288
[58] Field of Search ................................. 428/64.1, 64.2, 428/64.4, 688, 64.5, 698, 702, 913; 430/270.13, 495.1, 945; 369/283, 288

[56] References Cited

U.S. PATENT DOCUMENTS

| | | | |
|---|---|---|---|
| 4,660,175 | 4/1987 | Strand | 365/113 |
| 5,577,021 | 11/1996 | Nakatani et al. | 369/275.2 |
| 5,914,214 | 6/1999 | Ohta et al. | 430/270.13 |

FOREIGN PATENT DOCUMENTS 4-119886  4/1992  Japan .
8-124218  5/1996  Japan .

OTHER PUBLICATIONS

"Surface Science"; vol. 13, No. 5, pp. 286–293; 1992; Fujita et al.

*Primary Examiner*—Elizabeth Evans
*Attorney, Agent, or Firm*—Laubscher & Laubscher; R. J. Lasker

[57] ABSTRACT

An optical recording medium comprises a substrate and a multilayer structure on the substrate. The multilayer structure comprises a phase change type recording layer and a pair of dielectric layers, at least one of which contains zinc sulfide optionally with silicon oxide. When a depth profile of the multilayer structure in a thickness direction thereof is found by Auger electron spectroscopy, a region having an intensity ratio S/Zn of 2 or lower exists across a thickness of at least 6.0 nm, calculated as $SiO_2$, from the vicinity of an interface between the dielectric layer and the recording layer into the recording layer. In the vicinity of the interface between the dielectric layer and the recording layer, there is also a region having an intensity ratio S/Zn vs. O/Si relation that satisfies S/Zn<O/Si.

10 Claims, 5 Drawing Sheets

OPTICAL RECORDING MATERIAL AND ITS FABRICATION METHOD

BACKGROUND OF THE INVENTION

The present invention relates to a phase change type optical recording material, and its fabrication method.

Highlight is recently focused on optical recording media capable of recording information at a high density and erasing the recorded information for rewriting or overwriting. One typical rewritable optical recording medium is of the phase change type wherein the recording layer is irradiated with laser beam to change its crystallographic state whereupon a change of reflectance by the crystallographic change is detected for reading. Optical recording media of the phase change type are of great interest since they can be overwritten by modulating the intensity of a single light beam and the optical system of the drive unit used for their operation is simpler as compared with magneto-optical recording media.

Most optical recording media of the phase change type use chalcogenide materials such as Ge—Te, and Ge—Sb—Te base materials which provide a substantial difference in reflectance between crystalline and amorphous states and have a relatively stable amorphous state.

In recent years, it has also been proposed to use compounds known as chalcopyrites.

Chalcopyrite compounds are extensively investigated as compound semiconductor materials, and applied to solar batteries and the like. The chalcopyrite compounds are composed of Ib—IIIb—VIb$_2$ or IIb—IVb—Vb$_2$ as expressed in terms of the Groups of the Periodic Table and have two stacked diamond structures. The structure of chalcopyrite compounds can be readily determined by X-ray structural analysis and their basic characteristics are described in Physics, Vol. 8, No. 8 (1987), page 441, Denki Kagaku (Electrochemistry), Vol. 56, No. 4 (1988), page 228, and other literature.

Among the chalcopyrite compounds, AgInTe$_2$ is known to be applicable as a recording material by diluting it with antimony or Sb or bismuth or Bi. The resulting optical recording media are generally operated at a linear velocity of about 7 m/s. See JP-A's 3-240590, 3-99884, 3-82593, 3-73384 and 4-151286.

In addition to these phase change type optical recording media using chalcopyrite compounds, JP-A's 4-267192, 4-232779 and 6-166268 disclose phase change type optical recording media wherein an AgSbTe$_2$ phase forms upon the crystallization of a recording layer.

When information is recorded on a phase change type optical recording medium, the recording layer is irradiated with laser beam of power (recording power) high enough to bring the recording layer to a temperature higher than the melting point thereof. The recording layer is melted at spots with the recording power applied thereon, and then quickly cooled so that recorded marks of amorphous nature can be formed. When the recorded marks are erased, on the other hand, the recording layer is irradiated with laser beam having such a relatively low power (erasing power) as to bring the temperature of the recording layer to a temperature higher than that the crystallization temperature thereof but lower than the melting point thereof. The recorded marks with the erasing power applied thereon go back to the amorphous state because they are slowly cooled down after heated to the temperature higher than their crystallization temperature. If recording power and erasing power are applied to the medium with a modulation of the intensity of a single light beam, overwriting is then possible.

However, a problem with a phase change type of optical recording media based on Ge—Sb—Te, AgInTe$_2$, and AgSbTe$_2$ systems is that C/N drops due to signal degradation such as erasure rate decreases or jitter increases due to repeated overwriting. This in turn leads to another problem that the number of repeatedly overwritable cycles is limited to about 1,000.

SUMMARY OF THE INVENTION

A primary object of the present invention is to apply simple means to a phase change type optical recording medium to thereby increase the number of overwritable cycles.

Such an object is achieved by the inventions defined below as (1) to (10).

(1) An optical recording medium comprising a multilayer structure on a substrate, said multilayer structure comprising a phase change type recording layer interleaved between a pair of dielectric layers, at least one of which contains zinc sulfide, wherein:

when a depth profile of said multilayer structure in a thickness direction thereof is found by Auger electron spectroscopy, a region having an intensity ratio S/Zn of 2 or lower exists across a thickness of at least 6.0 nm, calculated as SiO$_2$, from the vicinity of an interface between said at least one dielectric layer containing zinc sulfide and said recording layer into said recording layer.

(2) An optical recording medium comprising a multilayer structure on a substrate, said multilayer structure comprising a phase change type recording layer interleaved between a pair of dielectric layers, at least one of which contains zinc sulfide and silicon oxide, wherein:

when a depth profile of said multilayer structure in a thickness direction thereof is found by Auger electron spectroscopy, a region exists in the vicinity of an interface between said at least one dielectric layer containing zinc sulfide and silicon oxide and said recording layer, said region having an intensity ratio S/Zn vs. O/Si relation that satisfies:

S/Zn<O/Si (3) An optical recording medium comprising a multilayer structure on a substrate, said multilayer structure comprising a phase change type recording layer interleaved between a pair of dielectric layers, at least one of which contains zinc sulfide and silicon oxide, wherein:

when oxygen spectra measured by Auger electron spectroscopy are divided by factor analysis into an oxygen component 1 derived from oxygen present on an interface between said dielectric layers and said recording layer and an oxygen component 2 derived from said silicon oxide in said dielectric layer to find a depth profile of said multilayer structure in a thickness direction thereof for each oxygen spectrum, a depth profile of said oxygen component 1 has a peak in the vicinity of an interface between said at least one dielectric layer containing zinc sulfide and silicon oxide and said recording layer, and a ratio of a maximum value for said peak of said oxygen component 1 with respect to a maximum intensity of said oxygen component 2 is at least 0.1 while a half-width of said peak of said oxygen component 1 is at least 5.5 nm, expressed in terms of thickness calculated as $SiO_2$.

(4) The optical recording medium of any one of (1) to (3), wherein for said Auger electron spectroscopy, an electron beam having an acceleration voltage of 5 kV, an incident electron current of 150 nA and an angle of incidence of 60° is used, said angle of incidence defined by an angle between a direction of incidence of said beam on a sample and a normal of a surface of said sample, while an argon ion beam having an angle of incidence of 18.9° and an acceleration voltage of 2 kV rastered in a region of 3 mm×3 mm is used as an etching beam, said angle of incidence defined by an angle between a direction of incidence of said beam on a sample and a normal of a surface of said sample.

(5) A method of fabricating an optical recording medium comprising a substrate and a multilayer structure having, in order from said substrate, a first dielectric layer, a phase change type recording layer and a second dielectric layer laminated thereon, wherein:

said first dielectric layer is first formed, and then said recording layer is formed after a discharge treatment of said first dielectric layer in an oxidizing atmosphere.

(6) A method of fabricating an optical recording medium comprising a substrate and a multilayer structure having, in order from said substrate, a first dielectric layer, a phase change type recording layer and a second dielectric layer laminated thereon, wherein:

a process of forming said first dielectric layer by a sputtering technique comprises either one of steps of:
(a) introducing an oxygen gas into a sputtering atmosphere just before completion of formation of said first dielectric layer, and
(b) forming said first dielectric layer while introducing an oxygen gas into a sputtering atmosphere, and increasing a concentration of said oxygen gas just before completion of the formation of said first dielectric layer.

(7) A method of fabricating an optical recording medium comprising a substrate and a multilayer structure having, in order from said substrate, a first dielectric layer, a phase change type recording layer and a second dielectric layer laminated thereon, wherein:

a process of forming said second dielectric layer by a sputtering technique comprises either one of steps of:
(a) introducing an oxygen gas into a sputtering atmosphere before, or simultaneously with, start of formation of said second dielectric layer, and interrupting the introduction of said oxygen gas just after the start of formation of said second dielectric layer, and
(b) introducing an oxygen gas into a sputtering atmosphere before, or simultaneously with, start of formation of said second dielectric layer, and decreasing a concentration of said oxygen gas in said atmosphere just after the start of formation of said second dielectric layer.

(8) A method of fabricating an optical recording medium comprising a substrate and a multilayer structure having, in order from said substrate, a first dielectric layer, a phase change type recording layer and a second dielectric layer laminated thereon, wherein:

a process of forming said recording layer by a sputtering technique comprises any one of steps of:
(a) introducing an oxygen gas into a sputtering atmosphere before, or simultaneously with, start of formation of said recording layer, and interrupting the introduction of said oxygen gas just after the start of formation of said recording layer,
(b) introducing an oxygen gas into a sputtering atmosphere before, or simultaneously with, start of formation of said recording layer, and decreasing a concentration of said oxygen gas in said atmosphere just after the start of formation of said recording layer,
(c) introducing an oxygen gas into a sputtering atmosphere just before completion of formation of said recording layer, and
(d) forming said recording layer while introducing an oxygen gas into a sputtering atmosphere, and increasing a concentration of said oxygen gas just before completion of formation of said recording layer.

(9) A method of fabricating an optical recording medium comprising a substrate and a multilayer structure having, in order from said substrate, a first dielectric layer, a phase change type recording layer and a second dielectric layer laminated thereon, wherein:

said recording layer is first formed, and then said second dielectric layer is formed after a discharge treatment of said recording layer in an oxidizing atmosphere.

(10) The fabrication method of any one of (5) to (9), wherein at least one of said first dielectric layer and said second dielectric layer contains zinc sulfide, or zinc sulfide and silicon oxide.

According to the present invention, there is provided an optical recording medium comprising a phase change type recording layer based on an In—Ag—Te—Sb or Ge—Sb—Te system, wherein the concentration of oxygen in the vicinity of an interface between the recording layer and a dielectric layer adjacent thereof is so relatively high that the number of overwritable cycles can be much more increased than ever before. The reason the introduction of oxygen in the vicinity of the interface between the recording layer and the dielectric layer brings about a remarkable increase in the number of overwritable cycles has yet to be clarified. However, a possible explanation of this could be that the segregation of the recording layer due to repeated overwriting, and the diffusion of elements from the dielectric layer into the recording layer are inhibited.

The number of overwritable cycles may possibly be achieved by uniformly oxidizing the whole of the first dielectric layer, the recording layer or the second dielectric layer. However, the effect on the increase in the number of overwritable cycles is much slender than that of the present invention. A particular problem with a Ge—Sb—Te base recording layer is that output becomes small if it is grossly oxidized. JP-A 4-119886 discloses an optical recording medium comprising a recording film obtained by incorporating nitrogen in a material comprising Te, Ge and Sb, and a dielectric film obtained by incorporating oxygen in a dielectric material comprising a $ZnS$—$SiO_2$ mixture. The example therein shows that sputtering is carried out in a mixed gas of Ar and oxygen to form the dielectric layer. This means that oxygen is distributed throughout the dielectric layer, failing to achieve an effect equivalent to that of the invention.

BRIEF DESCRIPTION OF THE DRAWINGS

These and further features of the present invention will be apparent with reference to the following description and drawings, in which.

BEST MODE FOR CARRYING OUT THE INVENTION

Figure 1:
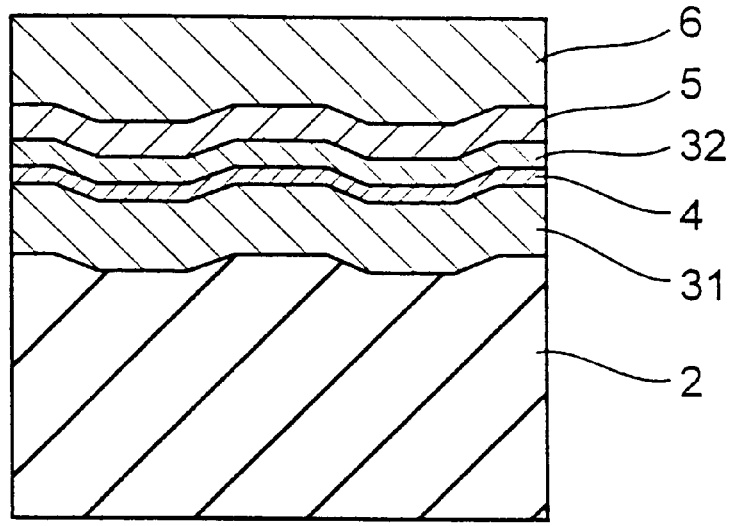
FIG. 1 is a fragmentary section of one exemplary architecture of the optical recording medium according to the invention.

Some preferable embodiments of the present invention will now be explained at great length.

Introduction of Oxygen

The optical recording medium of the invention comprises a substrate and a multilayer structure on the substrate, wherein the multilayer structure has, in order from the substrate side, a first dielectric layer, a change phase type recording layer and a second dielectric layer laminated thereon. In the invention, oxygen is introduced in the vicinity of an interface between the first dielectric layer and the recording layer and/or in the vicinity of the second dielectric layer and the recording layer so that the number of overwriting cycles can be much more increased than ever before.

Preferably, the optical recording medium of the invention has the following three embodiments 1, 2, and 3 in terms of the introduction of oxygen therein.

Embodiment 1

According to embodiment 1, the first dielectric layer and/or the second dielectric layer contain zinc sulfide, and oxygen is introduced in the vicinity of an interface between at least one of the dielectric layers containing zinc sulfide and the recording layer.

When the optical recording medium according to embodiment 1 is measured for a depth profile of the multilayer structure in a thickness direction thereof by Auger electron spectroscopy, a region having an intensity ratio S/Zn of 2 or lower is found to exist across a thickness of at least 6.0 nm and preferably at least 11 nm, calculated as $SiO_2$, from the vicinity of the interface between at least one of the dielectric layers containing zinc sulfide and the recording layer into the recording layer. When the region having an intensity ratio S/Zn of 2 or lower is too thin, no sufficient effect is achievable on the increase in the number of overwriting cycles.

Embodiment 2

According to embodiment 2, the first dielectric layer and/or the second dielectric layer contain zinc sulfide and silicon oxide, and oxygen is introduced in the vicinity of an interface between at least one of the dielectric layers containing zinc sulfide and silicon oxide and the recording layer.

When the optical recording medium according to embodiment 2 is measured for a depth profile of the multilayer structure in a thickness direction thereof by Auger electron spectroscopy, a specific region is found to exist in the vicinity of an interface between at least one of the dielectric layers containing zinc sulfide and silicon oxide and the recording layer, said specific region having an intensity ratio S/Zn vs. O/Si relation that satisfies:

$$S/Zn < O/Si$$

In the absence of such a specific region, no sufficient effect will be obtained on an increase in the number of overwriting cycles. This specific region has a thickness of preferably at least 5 nm, and more preferably 7 to 13 nm, calculated as $SiO_2$.

Embodiment 3

According to embodiment 3, the first dielectric layer and/or the second dielectric layer contain zinc sulfide and silicon oxide, and oxygen is introduced in the vicinity of an interface between at least one of the dielectric layers containing zinc sulfide and silicon oxide and the recording layer.

When the optical recording medium according to embodiment 3 is measured for an oxygen distribution of the multilayer structure in a thickness direction thereof by Auger electron spectroscopy, it shows such a distribution as explained just below. For the measurement of the oxygen distribution, oxygen spectra are separated by factor analysis into a spectrum for oxygen derived from silicon oxide forming the dielectric layer(s) and a spectrum for oxygen introduced for the formation of the dielectric layer(s) and recording layer, so that a distribution for each oxygen can be found by itself. More specifically, the oxygen spectra are separated into an oxygen component 1 derived from oxygen present on the interface(s) between the dielectric layer(s) and the recording layer and an oxygen component 2 derived from silicon oxide in the dielectric layer(s), so that the intensity distribution profile of the multilayer structure in the thickness direction thereof can be found for each oxygen spectrum.

For factor analysis, and applications of factor analysis to depth-wise state analysis by Auger electron spectroscopy, for instance, see "Surface Science", Vol. 13, No. 5, page 286, 1992, E. R. Malinowski and D. G. Howery, "Factor Analysis in Chemistry" (R. E. Kgrieger, Malabar Fla., 1989), S. W. Gaarenstroom, J. Vac. Sci. Technol., 16, 600 (1979), and S. W. Gaarenstroom, Appl. Surf. Sci., 26, 561 (1986). By using factor analysis in combination with Auger electron spectroscopy, it is possible to achieve identification of states, e.g., discriminate metals from their oxides. In the invention, it is possible to make a distinction between the oxygen derived from silicon oxide in the dielectric layer(s) and the oxygen introduced in the dielectric layer(s)-recording layer interface.

The intensity distribution profile of the oxygen component 1 has a peak corresponding to the region with oxygen introduced in it. Hereinafter, this peak will be called the interface oxygen peak. The maximum intensity of the interface oxygen peak is at least 0.1, and preferably at least 0.2 with respect to the maximum intensity of the oxygen component 2. In this case, the half-width of the interface oxygen peak is at least 5.5 nm calculated as $SiO_2$. Either when the maximum intensity of the interface oxygen peak is relatively too low or when the half-width of the interface oxygen peak is small, no insufficient effect is obtained on the increase in the number of overwriting cycles. Too large a half-width implies that the amount of oxygen diffused into the recording layer is large, resulting in a signal output drop. It is thus preferable that the half-width of the interface oxygen peak is up to 10 nm.

It is here to be noted that with factor analysis it is difficult to make a perfect distinction between the oxygen derived from silicon oxide in the dielectric layer(s) and the oxygen introduced in the dielectric layer(s)-recording layer interface. It is thus believed that the oxygen component 1 separated by factor analysis contains a trace amount of a component derived from silicon oxide in the dielectric layer(s). If the peak of the oxygen component 1 separated by factor analysis meets the aforesaid relation, however, it is then possible to achieve the effect on the increase in the number of overwriting cycles.

In each of embodiments 1, 2, and 3, an electron beam having an acceleration voltage of 5 kV, an incident electron current of 150 nA and an angle of incidence of 60° (defined by an angle between the direction of incidence of the beam on a sample and the normal of the surface of the sample) is used for Auger electron spectroscopy. As the ion etching beam for the same spectroscopy, use is made of an Ar beam having an angle of incidence of 18.9° (defined by an angle between the direction of incidence of the beam on a sample and the normal of the surface of the sample) and an acceleration voltage of 2 kV rastered in a region of 3 mm×3 mm.

Here the thickness of the recording layer or the dielectric layers is defined as the half-width of a peak appearing on an element intensity distribution graph. In the case of a layer containing a plurality of elements with intensity peaks of elements having different half-widths, only a peak having the greatest intensity is taken into account.

By the thickness calculated as $SiO_2$ is intended a sputtering time converted to depth (thickness) by using a sputtering rate for $SiO_2$.

When the recording layer in each of embodiments 1, 2 and 3 has an In—Ag—Te—Sb base composition, it is preferable to introduce oxygen at least in the vicinity of the interface between the second dielectric layer and the recording layer.

Introduction of Oxygen

In the practice of the invention, no particular limitation is placed on how to introduce oxygen in the vicinity of the interface(s) between the dielectric layer(s) and the recording layer. For instance, this may be achieved by:

(1) a process of forming the first dielectric layer, and then forming the recording layer after a discharge treatment of the first dielectric layer in an oxidizing atmosphere, (2) a process of forming the first dielectric layer by a sputtering technique, comprising either one of steps of:
 (a) introducing an oxygen gas into a sputtering atmosphere just before completion of formation of the first dielectric layer, and
 (b) forming the first dielectric layer while introducing an oxygen gas into a sputtering atmosphere, and increasing a concentration of the oxygen gas just before completion of the formation of the first dielectric layer, (3) a process of forming the second dielectric layer by a sputtering technique, comprising either one of steps of:
 (a) introducing an oxygen gas into a sputtering atmosphere before, or simultaneously with, start of formation of the second dielectric layer, and interrupting the introduction of the oxygen gas just after the start of formation of the second dielectric layer, and
 (b) introducing an oxygen gas into a sputtering atmosphere before, or simultaneously with, start of formation of the second dielectric layer, and decreasing a concentration of the oxygen gas in the atmosphere just after the start of formation of the second dielectric layer, (4) a process of forming the recording layer by a sputtering technique, comprising any one of steps of:
 (a) introducing an oxygen gas into a sputtering atmosphere before, or simultaneously with, start of formation of the recording layer, and interrupting the introduction of the oxygen gas just after the start of formation of the recording layer,
 (b) introducing an oxygen gas into a sputtering atmosphere before, or simultaneously with, start of formation of the recording layer, and decreasing a concentration of the oxygen gas in the atmosphere just before the start of formation of the recording layer,
 (c) introducing an oxygen gas into a sputtering atmosphere just before completion of formation of the recording layer, and
 (d) forming the recording layer while introducing an oxygen gas into a sputtering atmosphere, and increasing a concentration of the oxygen gas just after completion of formation of the recording layer, and (5) a process of forming the recording layer, and then forming the second dielectric layer after a discharge treatment of the recording layer in an oxidizing atmosphere. In the practice of the invention, at least one may be selected from these processes.

Referring to process (2), let $t_1$ be an introduction time of the oxygen gas during the formation of the first dielectric layer or a time during which the concentration of the oxygen gas is relatively high, and $r_1$ be a rate for forming the first dielectric layer. It is then preferable that $t_1 \times r_1$ is preferably 5 to 30 nm, and more preferably 10 to 30 nm. Referring to process (3), let $t_2$ be an introduction time of the oxygen gas during the formation of the second dielectric layer or a time during which the concentration of the oxygen gas is relatively high, and $r_2$ be a rate for forming the second dielectric layer. It is then preferable that $t_2 \times r_2$ is preferably 0.5 to 3.0 nm, and more preferably 1.0 to 3.0 nm. In the present disclosure, $t_1 \times r_1$ or $t_2 \times r_2$ is referred to as the oxide layer thickness. It is here to be noted that this oxide layer thickness is usually different from an actually found oxide layer thickness because of the diffusion of elements.

When each of processes (1) to (5) is carried out, it is preferable that a mixed gas of an Ar or other inert gas and oxygen gas is introduced at a flow rate ratio, $[O_2/(Ar+O_2)]$, of 5 to 40%.

Optical Recording Medium of FIG. 1

One exemplary architecture of the optical recording medium to which the present invention is applied is shown in FIG. 1. As shown, this optical recording medium has on a substrate 2 a first dielectric layer 31, a recording layer 4, a second dielectric layer 32, a reflective layer 5, and a protective layer 6 in the described order, and so is called a one-sided recording (single plate) type medium. The present invention is also applicable to a double-sided recording medium comprising two such one-sided recording media bonded together via an adhesive layer while the protective layers 6 face each other. Furthermore, the present invention may be applied to a medium prepared by bonding one such one-sided recording medium to a protecting substrate.

Dielectric Layers 31 and 32

The first dielectric layer 31 is provided to prevent oxidation of the recording layer, and protect the substrate by cutting off heat that may otherwise be conducted from the recording layer to the substrate during recording. The second dielectric layer 32 is provided to protect the recording layer, and escape the heat remaining in the recording layer by heat conduction after the completion of recording. Both the dielectric layers also contribute to an improved degree of modulation.

Any desired dielectric material may be used for the first, and second dielectric layers. For instance, various dielectric materials or their mixtures such as various transparent ceramics, e.g., silicon oxide, silicon nitride, ZnS—$SiO_2$ may be used. In some cases, various glasses may be used. It is also acceptable to use the so-called LaSiON containing La, Si, O and N, and the so-called SiAlON containing Si, Al, O and N optionally with Y.

In accordance with the present invention, at least one of the upper and lower dielectric layers contains zinc sulfide for the purpose of optimizing properties such as the index of refraction. In the present disclosure, the zinc sulfide-containing dielectric layer will hereinafter be referred to as the ZnS-containing dielectric layer. In the practice of the present invention, the ZnS-containing dielectric layer further contains a metal element A that has a standard free energy for the formation of a sulfide thereof lower than a standard free energy for the formation of ZnS at 0 to 1,000° C. By incorporating metal element A in the ZnS-containing dielectric layer, it is possible to prevent sulfur release upon repeated overwriting cycles, thereby preventing jitter increases and, hence, increasing the number of repeatedly overwritable cycles.

In the practice of the present invention, it is preferable to use at least one element selected from the group consisting of cerium or Ce, calcium or Ca, magnesium or Mg, strontium or Sr, barium or Ba, and sodium or Na, with Ce being most preferable because of its low standard free energy for the formation of its sulfide. At 300° K, for instance, the standard free energy is ca. −230 kJ/mol for the formation of ZnS, ca. −540 kJ/mol for the formation of CeS, ca. −510 kJ/mol for the formation of CaS, ca. −390 kJ/mol for the formation of MgS, ca. −500 kJ/mol for the formation of SrS, ca. −460 kJ/mol for the formation of BaS, and ca. −400 kJ/mol for the formation of $Na_2S$.

In the ZnS-containing dielectric layer, the ratio of metal element A to all metal elements is less than 2 at %, preferably up to 1.5 at %, and more preferably up to 1.3 at %. Too much metal element A is substantially ineffective for prevention of jitter increases upon repeated overwriting cycles. To take full advantage of the present invention, it is preferred that the proportion of metal element A is particularly at least 0.01 at %, and more particularly at least 0.03 at %. The ratio of metal element A to all metal elements may be determined by fluorescent X-ray analysis, EPMA (electron probe X-ray microanalysis), or the like. In the present disclosure, all metals in the dielectric layer are understood to include metalloids such as silicon or Si.

In the dielectric layer, metal element A may be present in the form of any of a single substance, sulfide, oxide, fluoride, etc.

Preferably, the ZnS-containing dielectric layer contains, in addition to zinc sulfide, for instance, oxides, nitrides, and fluorides. Such compounds, for instance, include silicon oxides ($SiO_2$, SiO), tantalum oxide ($Ta_2O_5$), titanium oxide ($TiO_2$), lanthanum oxide ($La_2O_3$), silicon nitride ($Si_3N_4$), aluminum nitride (AlN), magnesium fluoride ($MgF_2$), sodium fluoride (NaF), and thorium fluoride ($ThF_4$), at least one of which is preferably used in the practice of the present invention.

The zinc sulfide content of the ZnS-containing dielectric layer is preferably 50 to 95 mol %, and more preferably 70 to 90 mol %. Too little ZnS makes the thermal conductivity of the dielectric layer too high and the refractive index thereof too low to achieve high C/N. Too much, on the other hand, detracts from robustness upon overwriting. The ZnS content of the dielectric layer may be determined on the basis of the quantity of sulfur and the quantity of zinc found by fluorescent X-ray analysis or the like. When, for instance, zinc is in excess of sulfur, excessive zinc is supposed to exist in the form of other compound, e.g., ZnO.

While an account has been given of a specific arrangement wherein the ZnS-containing dielectric layer contains metal element A, it is understood that an intermediate layer containing metal element A may be interleaved between the ZnS-containing dielectric layer and the recording layer. Such an intermediate layer, for instance, may be made up of cerium oxide ($CeO_2$) alone or a ZnS—$CeO_2$ mixture.

When only one of the first and second dielectric layers is used in the form of the ZnS-containing dielectric layer, the other or ZnS-free dielectric layer may be made up of any desired material, for instance, various dielectric materials other than ZnS.

Preferably, the first and second dielectric layers have a refractive index of at least 1.4, and especially at least 1.8 in the wavelength range of 400 to 850 nm. In this regard, the aforesaid wavelength range includes a wavelength 780 nm at which state-of-the-art CD players are used, and wavelengths 630–680 nm which are a candidate for the next-generation wavelengths now under development. The optical recording media of the present invention are preferably used in such a wavelength range.

The first dielectric layer 31 has a thickness of preferably 50 to 300 nm, and more preferably 100 to 250 nm. By allowing the first dielectric layer to have such a thickness, it is possible to ensure effective prevention of damage to the substrate upon recording, and to increase the degree of modulation as well. The second dielectric layer 32 has a thickness of preferably 10 to 30 nm, and more preferably 13 to 20 nm. By allowing the second dielectric layer to have such a thickness, it is possible to ensure a fast cooling rate, and hence to clearly delimit the edges of recorded marks, resulting in reduced jitters. Such a thickness also enables the degree of modulation to be increased.

Each dielectric layer is preferably formed by vapor phase growth processes such as sputtering, and evaporation. The incorporation of metal element A in the dielectric layer may be achieved by various processes. When, for instance, cerium is used as metal element A, the target used may comprise a major target providing a major component of the dielectric layer, on which a chip composed of cerium alone or $CeO_2$ is placed. Alternatively, $CeO_2$ or other cerium compound may be incorporated in the major target. In another target embodiment wherein calcium or magnesium is used as metal element A, a chip composed of CaO or MgO may be placed on the aforesaid major target to form a target. However, this embodiment is not preferable because of the deliquescence of such compounds. Preferably in this case, therefore, a chip composed of $CaF_2$ or $MgF_2$ is placed on the major target to form a target. When strontium, barium or sodium is used as metal element A, too, it is preferable to use a fluoride chip rather than an oxide chip in view of deliquescence. Calcium, magnesium, strontium, barium, and sodium may be incorporated in the major target in the form of an oxide or other compound. It is noted that a composite target such as ZnS—$SiO_2$ may be used for the major target, or use may be made of a multi-target process wherein ZnS, and $SiO_2$ are independently used as the major target.

Recording Layer 4

The composition of the recording layer is not critical to the practice of the present invention. However, it is understood that the present invention is very effective for optical recording media having recording layers based on In—Ag—Te—Sb and Ge—Sb—Te compositions, and especially Ge—Sb—Te compositions.

In the present invention, the atomic ratio of elements constituting a recording layer based on the In—Ag—Te—Sb composition is given by formula I:

$$[(In_aAg_bTe_{1-a-b})_{1-c}Sb_c]_{1-d}M_d$$

Preferably, the letters a, b, c and d fall in the ranges:
  a=0.1 to 0.3
  b=0.1 to 0.3
  c=0.5 to 0.8
  d=0 to 0.20
More preferably, the letters a, b, c and d fall in the ranges:
  a=0.11 to 0.28
  b=0.15 to 0.28
  c=0.55 to 0.78
  d=0.005 to 0.10

When the value of a in formula I is too small, the indium or In content of the recording layer becomes relatively too small. This in turn makes the amorphism of recorded marks insufficient, resulting in a drop of the degree of modulation, and a reliability drop as well. At too large a value of a, on the other hand, the In content of the recording layer becomes relatively too high. This in turn makes the reflectance of areas other than the recorded marks low, resulting in a drop of the degree of modulation.

When the value of b in formula I is too small, the silver or Ag content of the recording layer becomes relatively too low. This in turn makes the recrystallization of recorded marks difficult and so renders repeated overwriting difficult. At too large a value of b, on the other hand, the Ag content of the recording layer becomes relatively high, and so excessive Ag diffuses independently into an Sb phase at the time of recording or erasing. This in turn makes the robustness of the recording layer upon rewriting low, and renders the stability of both recorded marks and crystalline portions low, resulting a reliability drop. In other words, the crystallization of the recorded marks is promoted during storage at high temperatures, often resulting in drops of C/N and the degree of modulation. Repetition of recording may often facilitate deterioration of C/N and the degree of modulation.

When the value of a+b is too small, a tellurium or Te phase is formed by excessive Te. The Te phase makes erasing difficult because it slows down the rate of crystal transition. When the value of a+b is too large, on the other hand, it is difficult to make the recording layer amorphous, leading to a possibility that signals may not be recorded.

When the value of c in formula I is too small, there is an increased reflectance difference concomitant with a phase change, but difficulty is involved in erasing because of an abrupt crystal transition rate drop. At too large a value of c, on the other hand, there is a decreased degree of modulation due to a decreased reflectance difference incidental to the phase change.

In formula I, M represents at least one element selected from the group consisting of H, Si, C, V, W, Ta, Zn, Ti, Ce, Tb and Y. The element M is effective for improving rewriting robustness, more specifically reducing the drop of the rate of erasure due to repeated rewriting, and contributes to a reliability improvement under unfavorable conditions, e.g., high temperature and humidity conditions. Of these elements, it is preferable to use at least one of V, Ta, Ce and Y because their such effects are strong. Particular preference is given to at least one of V and Ta, with V being most preferred.

When the value of d representing the content of the element M is too large, no sufficient degree of modulation is obtainable because of a decreased reflectance difference concomitant with a phase change. When the value of d is too small, the effect of the element M added becomes slender.

It is preferred that the recording layer based on this composition consists essentially of Ag, Sb, Te and In, and the element or elements M added if required. In the practice of the present invention, however, it is acceptable that the silver may be partially replaced by gold or Au, the antimony may be partially replaced by bismuth or Bi, the tellurium may be partially replaced by selenium or Se, and the indium may be partially replaced by aluminum or Al and/or phosphorus or P.

The percent replacement of Ag by Au is preferably up to 50 at %, and more preferably up to 20 at %. At too high a percent replacement, recorded marks are susceptible to crystallization, leading to a reliability drop at high temperatures.

The percent replacement of Sb by Bi is preferably up to 50 at %, and more preferably up to 20 at %. Too high a percent replacement causes the recording layer to have an increased coefficient of absorption, resulting in a reduction of the interference effect of light. This in turn makes the reflectance difference between crystalline and amorphous portions and hence the degree of modulation low, so failing to obtain high C/N.

The percent replacement of Te by Se is preferably up to 50 at %, and more particularly up to 20 at %. Too high a percent replacement causes the rate of crystal transition to become too low to obtain any sufficient rate of erasure.

The percent replacement of In by Al and/or P is preferably up to 40 at %, and more preferably up to 20 at %. Too high a percent replacement causes the stability of recorded marks to become low with a reliability drop. It is noted that Al and P may be used at any desired proportion.

It is noted that, after repeated rewriting, the recording layer based on this composition has a coefficient of absorption k of about 3.3 in a crystalline state, and about 2.2 in a micro-crystalline or amorphous state.

The recording layer based on the aforesaid composition has a thickness of preferably 9.5 to 50 nm, and more preferably 13 to 30 nm. Too thin a recording layer makes the growth of a crystalline phase difficult, and so renders a reflectance change incidental to a phase change insufficient. Too thick a recording layer, on the other hand, causes a large amount of silver to diffuse in the recording layer in a thickness direction thereof during the formation of recorded marks. This in turn makes the proportion of silver diffusing in a longitudinal direction of the recording layer low, resulting in a drop of the reliability of the recording layer. Too thick a recording layer gives rise to drops of both reflectance and the degree of modulation.

The atomic ratio of elements constituting a recording layer based on the Ge—Sb—Te composition is given by formula II:

$$Ge_aSb_bTe_{1-a-b}$$

Preferably, the letters a and b fall in the ranges:
  $0.08 \leq a \leq 0.25$
  $0.20 \leq b \leq 0.40$ When the value of a in formula II is too small, recorded marks are difficult to crystallize, resulting in a decrease in the rate of erasure. At too large a value of a, on the other hand, much tellurium binds to germanium. The resulting precipitation of antimony in turn makes it difficult to form recorded marks.

When the value of b in formula II is too small, recorded marks are susceptible to crystallization during storage at high temperatures due to the presence of much tellurium, resulting in a reliability drop. When the value of b is too large, it is difficult to form recorded marks due to the precipitation of antimony.

The recording layer based on the aforesaid composition has a thickness of preferably 14 to 50 nm. Too thin a recording layer makes the growth of a crystalline phase difficult, and so renders a reflectance change incidental to a phase change insufficient. Too thick a recording layer, on the other hand, gives rise to drops of both reflectance and the degree of modulation.

The composition of the recording layer may be determined by EPMA, X-ray microanalysis, ICP, or the like.

Preferably, the recording layer is formed by sputtering. Sputtering conditions are not critical to the practice of the present invention. For instance, an alloy target or a multi-sputtering process with a plurality of targets may be used for the sputtering of a material comprising a plurality of elements.

In some cases, oxygen may possibly be incorporated in the recording layer according to the invention because such an oxygen concentration distribution as mentioned above is provided across the multilayer structure comprising the recording layer and dielectric layers. In this regard, it is to be noted that the aforesaid formulae represent the ratios among constituting elements except oxygen.

Reflective Layer 5

The reflective layer may be formed of any desired material, usually any of high-reflectance metals or alloys of such metals, for instance, Al, Au, Ag, Pt, Cu, Ni, Cr and Ti, and has preferably a thickness of 30 to 300 nm. At a thickness less than the lower limit of this range, it is difficult to obtain any sufficient reflectance. A thickness exceeding the upper limit of the range provides no further improvement in reflectance, and is rather unfavorable in view of cost-effectiveness. Preferably, the reflective layer is formed by vapor phase growth processes such as sputtering or evaporation.

Protective Layer 6

The protective layer is provided to improve scratch resistance and corrosion resistance. Preferably, this protective layer is formed of various organic materials. However, particular preference is given to constructing the protective layer of a radiation-curable type compound or a composition thereof, which is cured with radiation such as electron beams or ultraviolet rays. The protective layer 7 has usually a thickness of about 0.1 to 100 $\mu$m, and may be formed by ordinary processes such as spin coating, gravure coating, spray coating, and dipping.

Adhesive Layer

Adhesives forming the adhesive layer are not critical in the practice of the invention; for instance, a selection may be made from a hot-melt adhesive, an ultraviolet radiation curing adhesive, and a cold setting adhesive. A tackifier may also be accepted.

Figure 2:
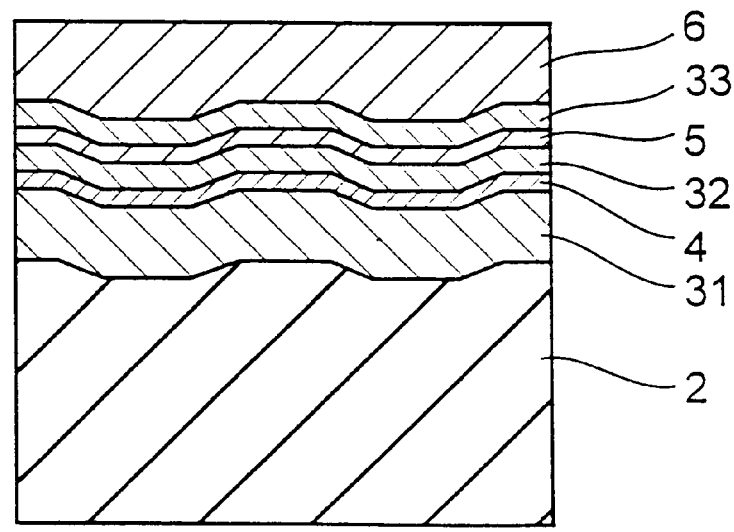
FIG. 2 is a fragmentary section of another exemplary architecture of the optical recording medium according to the invention.

Optical Recording Medium of FIG. 2

Another exemplary architecture of the optical recording medium to which the present invention is applicable is illustrated in FIG. 2. With the optical recording medium of this architecture, it is possible to further reduce jitter increases due to repeated overwriting. Hereinafter, an account will be given of why the architecture of FIG. 2 is selected.

In a phase change type optical recording medium, the absorptance (Ac) of the recording layer at an area (in a crystalline state) other than a recorded mark area is often different from the absorptance (Aa) of the recording layer at the recorded mark area (in a non-crystalline state). In general, Ac<Aa. It is here to be noted that Ac and Aa are each a value at the wavelength of a write/read laser beam. For this reason, recording sensitivity and the rate of erasure vary largely depending on whether the overwriting area was in the crystalline state or in the non-crystalline state. Consequently, there are variations in the length and width of recorded marks formed by overwriting, which may otherwise result in increased jitters and, hence, errors. Especially when high recording density is achieved by mark edge recording wherein information is carried at both ends of a recorded mark, there are even more errors under the possible influence of fluctuations in the length of the recorded mark. To solve this problem, it is preferable that Ac/Aa>0.9, especially Ac=Aa, and more especially Ac>Aa if the influence of latent heat is taken into account. This may be achieved by controlling the thickness of the recording layer or the thickness of the dielectric layers between which the recording layer is interleaved. If Ac/Aa>0.9 is applied to a medium of ordinary structure, another problem then arises; C/N becomes low due to a small difference between the reflectance (Rc) of the medium at an area other than a recorded mark area and the reflectance (Ra) of the medium at the recorded mark area.

Situations being like this, for instance, JP-A 8-124218 has proposed an optical information recording medium comprising a substrate, and a first dielectric layer, a recording layer, a second dielectric layer, a reflective layer, a third dielectric layer and an ultraviolet radiation curing layer stacked thereon in the described order, wherein Ac>Aa, a transmitting super-thin metal film or Si or Ge is used as the reflective layer, and a dielectric material having a refractive index of greater than 1.5 is used as the third dielectric layer. By providing the light transmitting reflective layer and the third dielectric layer having a high refractive index, it is thus possible to obtain the Ac/Aa ratio within the aforesaid range while large Rc-Ra is kept.

It is here to be noted that Ac and Aa may be found from the optical constant of each layer and the wavelength of write/read laser beam.

The optical recording medium of FIG. 2 is a one-sided recording medium comprising a reflective layer 5 having the same structure as disclosed in the aforesaid JP-A 8-124218, and a third dielectric layer 33 interleaved between the reflective layer 5 and a protective layer 6. It is here to be noted that a substrate 2, a first dielectric layer 31, a recording layer 4, a second dielectric layer 32 and the protective layer 6 are the same as those in the optical recording medium of FIG. 1. In this architecture, too, two such media may be bonded together to form a double-sided recording medium as in the case of the one-sided recording medium shown in FIG. 1. Furthermore, a protecting substrate may be bonded to one such one-sided recording medium.

Referring further to FIG. 2, the reflective layer 5 is preferably made up of a super-thin metal layer having a high light transmittance, or Si, Ge or other material that shows a high transmittance in the near infrared to infrared regions in which write/read wavelengths are included. The thickness of the reflective layer may be approximately determined in such a way as to make correction for an absorptance difference between an area of the recording layer other than a recorded mark area the recorded mark area. A preferable thickness range of the reflective layer varies largely depending on the material of which the reflective layer is constructed, and so may be appropriately determined depending on that material. For instance, when a metal such as Au is used for the reflective layer, the reflective layer has a thickness of preferably up to 40 nm, and more preferably 10 to 30 nm. When Si or Ge is used, the reflective layer has a thickness of preferably up to 80 nm, and more preferably 40 to 70 nm. Too thin a reflective layer incurs a C/N drop whereas too large a reflective layer is insufficient to achieve the aforesaid effect on making correction for an absorptance difference.

When the reflective layer is made up of a metal, it is preferable to use Au or an Au alloy. The Au alloy used herein contains Au as a main component and further includes at least one element selected from the group consisting of Al, Cr, Cu, Ge, Co, Ni, Mo, Ag, Pt, Pd, Ta, Ti, Bi and Sb.

This reflective layer, too, is preferably formed by vapor phase growth techniques such as sputtering, and evaporation.

The third dielectric layer 33, which may be provided on the reflective layer 5 as occasion demands, is preferably made up of a material having a refractive index higher than that of the protective layer 6. By the provision of such a third dielectric layer, it is possible to increase the aforesaid Ac/Aa while the reflectance difference between a recorded mark area and other area is kept large, as in the case of the invention disclosed in the aforesaid JP-A 8-124218.

The third dielectric layer may be made up of a material selected from the dielectric materials already mentioned in conjunction with the first, and second dielectric layers.

The third dielectric layer has a thickness of preferably 30 to 120 nm, and more preferably 40 to 90 nm. It is here to be noted that too thin a third dielectric layer results in a signal output decrease whereas too thick a third dielectric layer results in a phenomenon called cross erasure, where signals on adjacent tracks are erased.

In the architecture where Ac and Aa are controlled as mentioned above, it is preferable that the transmission factor of write/read laser beam upon irradiation of the lower side of the transparent substrate with the laser beam, i.e., the ratio of transmitted light with respect to incident light is at least 1%, and especially at least 3%. By the transmission factor used herein is intended a value found where only the inorganic layers are present on the transparent substrate. In other words, the transmission factor is found with removal of the protective layer 6 from the architecture of FIG. 2, indicating the result of multiple reflection of light among the inorganic layers such as the recording layer, dielectric layers, and reflective layer. If the transmission factor lies within such a range, the ratio of Ac with respect to Aa is increased. It is then easy to place the Ac/Aa ratio within the aforesaid preferable range.

The transmission factor may be measured by means of a spectrophotometer. The region to be measured is not particularly critical, and so may be either a crystalline area or a non-crystalline area. Usually, however, it is preferable to measure the crystalline region (mirror area) with no grooves found thereon.

Rewriting

For rewriting, the optical recording medium of the present invention may be irradiated with light as is the case with a conventional phase change type optical recording medium. A pulse form of recording power may be applied on the optical recording medium. If one signal is recorded by at least two exposures to light, the accumulation of heat in recorded marks can then be so reduced that the dilation of the trailing edges of the recorded marks (teardrop phenomena) can be avoided, resulting in an improved C/N. A pulse form of irradiation of the optical recording medium with light also contributes to an improvement in the rate of erasure. Actual values of recording power and erasing power may be experimentally determined. It is understood that the reading laser beam used should be of such low power that the crystallographic state of the recording layer can remain substantially unaffected.

For recording, the linear velocity of the recording layer of the optical recording medium according to the present invention is usually about 0.8 to 20 m/s, and preferably 1.2 to 16 m/s with respect to laser beam.

Insofar as the optical recording medium including the recording layer having the aforesaid composition is concerned, the light used for rewriting or reading may be freely selected from a wide wavelength region, for instance, from the range of 100 to 5,000 nm.

EXAMPLE

The present invention will now be explained more specifically with reference to some examples thereof.

Example 1

A single plate type optical recording disk sample used as the optical recording medium of FIG. 1 was prepared as follows.

Used for substrate 2 was a disk form of polycarbonate of 120 mm in diameter and 0.6 mm in thickness, which was simultaneously provided with grooves (of 0.6 µm in width, 65 nm in depth and 1.2 µm in pitch) by extrusion molding.

First dielectric layer 31 was formed by sputtering in an Ar atmosphere. ZnS (85 mol %) —SiO2 (15 mol %) was used for the target. First dielectric layer 31 had a thickness of 220 nm.

Recording layer 4 was formed by sputtering. It is understood that the recording layer had a composition (atomic ratio) represented by formula I $[(In_aAg_bTe_{1-a-b})_{1-c}Sb_c]_{1-d}V_d$ where a=0.129, b=0.177, c=0.651, and d=0.015. The recording layer had a thickness of 17 nm.

Second dielectric layer 32 was formed by a sputtering process using ZnS (85 mol %) —SiO$_2$ (15 mol %) as a target. While an Ar/$_{o2}$ mixed gas was introduced in the atmosphere, sputtering was first carried out in such a way that the aforesaid oxide layer had a thickness of 2.0 nm. Then, after discharging O$_2$ by the introduction of Ar alone, sputtering was continued in the Ar atmosphere to obtain a dielectric layer of 15 nm in thickness. The mixed gas was introduced at a flow rate ratio, [O$_2$/(Ar+O$_2$)], of 10%.

Reflective layer 5 was formed in an Ar atmosphere by a sputtering process using an Al-Cr alloy target. The reflective layer had a thickness of 100 nm.

Protective layer 6 was formed by spin coating an ultraviolet radiation-curable resin, and irradiating the resin with ultraviolet radiation for curing. The protective layer had a post-curing thickness of 5 µm.

Using a measuring device equipped with an optical head having a wavelength of 680 nm and an NA of 0.6, 8–16 RLL signals were recorded on each of the thus prepared samples, and the output signals were measured by a time interval analyzer (TIA). It is here to be noted that the optimum linear velocity for each sample was selected from the range of 2 to 6 m/s. Based on the obtained measurements, the jitter was found by σ/Tw (%) where Tw is a window width. Herein the maximum value of the number of overwriting cycles, at which the jitter is within 13%, is defined as the number of overwritable cycles.

For the purpose of comparison, an optical recording disk sample was prepared as in the above samples with the exception that the second dielectric layer was formed with no $O_2$ introduced in the atmosphere. This comparative sample, too, was measured for the number of overwritable cycles, as mentioned just above.

As a result, it was found that the inventive samples are overwritable 10,000 times whereas the comparative sample is overwritable barely 1,000 times.

Example 2

Optical recording media having the architecture shown in FIG. 2 with oxygen concentration distribution peaks located at regions shown in Table 1 were prepared as follows.

Substrate 2 was the same as in Example 1.

First dielectric layer 31 was formed as in Example 1 with the exception that its thickness was changed to 240 nm.

When oxygen was introduced in the vicinity of the interface between the first dielectric layer and the recording layer, the first dielectric layer was first formed. Then, sputtering was further continued while an $Ar/O_2$ mixed gas was introduced in the atmosphere. The flow rate ratio, $[O_2/(Ar+O_2)]$, of the mixed gas, and the aforesaid oxide layer thickness are shown in Table 1.

Recording layer 4 had a composition represented by, in atomic ratio, $Ge_a Sb_b Te_{1-a-b}$ where a=0.225, and b=0.225. The recording layer was formed by sputtering in an Ar atmosphere, and had a thickness of 12 nm.

When oxygen was introduced throughout the recording layer, the recording layer was formed with an $Ar/O_2$ mixed gas introduced in the atmosphere. The flow rate ratio of the mixed gas was 10%.

Second dielectric layer 32 was formed as in Example 1. When oxygen was introduced in the vicinity of the interface between the second dielectric layer and the recording layer, the operation was carried out as in the samples of Example 1. However, the flow rate ratio of the mixed gas and the oxide layer thickness shown in Table 1 were applied.

Reflective layer 5 was formed to a thickness of 60 nm by using Si as a target in an Ar atmosphere.

Third dielectric layer 33 was formed as in first dielectric layer 31 with the exception that its thickness was changed to 80 nm.

Protective layer 6 was formed as in Example 1.

These samples were examined in terms of the number of overwritable cycles as in Example 1. The results are shown in Table 1.

Each sample shown in Table 1 was etched from the second dielectric layer side for Auger electron spectroscopy, thereby finding an element intensity distribution in a thickness direction thereof. Used for this measurement were an electron beam having an acceleration voltage of 5 kV, an incident electron current of 150 nA and an angle of incidence of 60° and an Ar beam having an angle of incidence of 18.9° and an acceleration voltage of 2 kV rastered in a region of 3 mm×3 mm. From the intensity distribution profile of each sample, the thickness of a region having an intensity ratio of 2 or lower was found. The results are shown in Table 1. There is also a region where a specific intensity ratio relation (S/Zn<O/Si) is satisfied. A symbol ○ in Table 1 indicates that the thickness of this region is at least 5 nm calculated as $SiO_2$, and a symbol X shows that the thickness of this region is below 5 nm calculated as $SiO_2$ or this region is not found at all.

Figure 3:
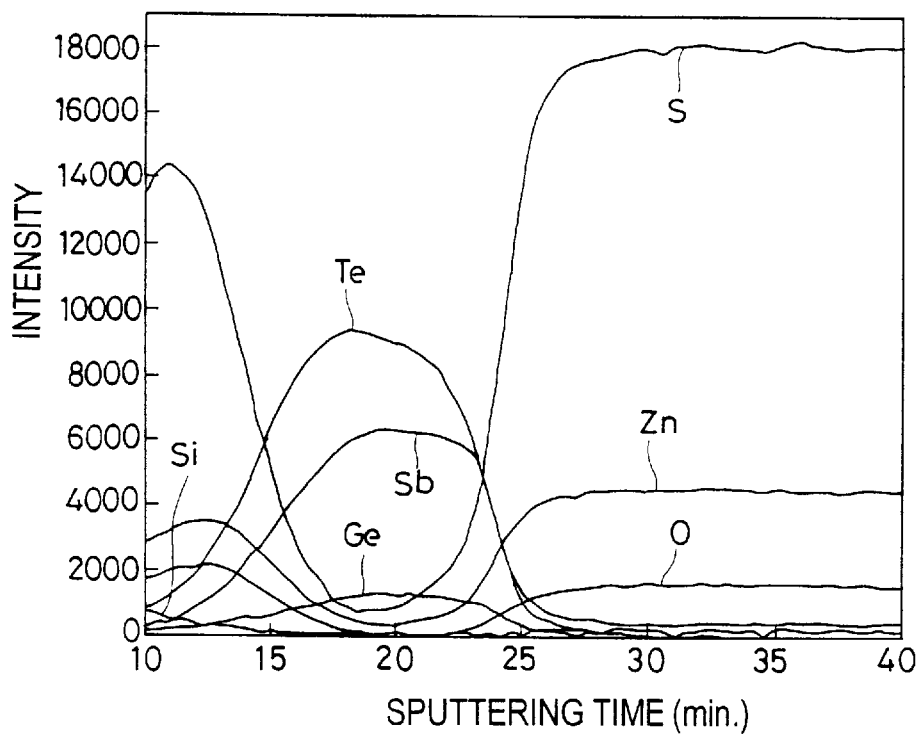
FIGS. 3(a) and 3(b) are graphs showing intensity distributions of elements found by Auger electron spectroscopy, in which the intensity distributions of elements from the second dielectric layer side to the first dielectric layer via the recording layer are plotted with intensity as ordinate and sputtering time as abscissa.
Figure 3:
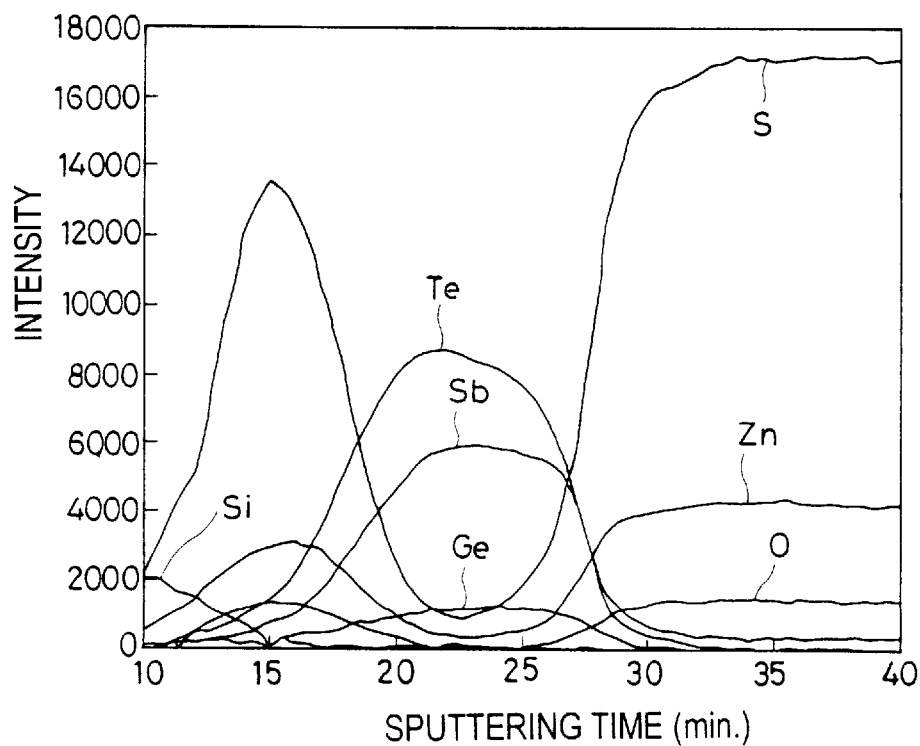
Figure 4:
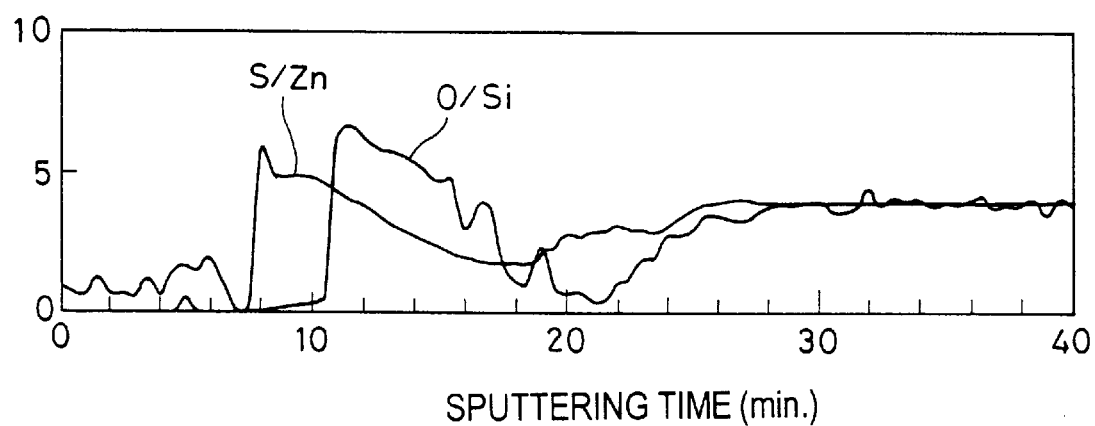
FIGS. 4(a) and 4(b) are graphs showing intensity distributions of elements found by Auger electron spectroscopy, in which the changes of S/Zn and O/Si from the second dielectric layer side to the first dielectric layer via the recording layer are plotted with sputtering time as abscissa.
Figure 4:
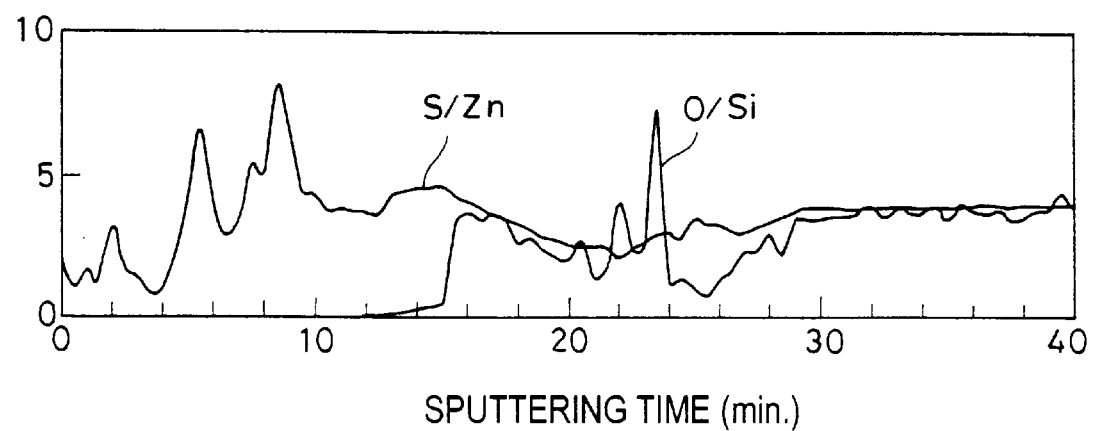

For reference, the element intensity distributions of sample No. 4 and comparative sample No. 1 in their thickness direction are shown in FIG. 3(a) and FIG. 3(b), respectively. From the results of measurement of these samples by Auger electron spectroscopy, the ratios S/Zn and O/Si were determined to find their distributions in the thickness direction. The results of sample No. 4 and comparative sample No. 1 are shown in FIGS. 4(a) and 4(b), respectively. FIGS. 4(a) and 4(b) reveal S/Zn changes in the thickness direction, and S/Zn vs. O/Si relations, with sputtering time (calculated as $SiO_2$ with a sputtering rate of 2.49 nm/min. calculated as $SiO_2$) as abscissa.

TABLE 1

| Sample No. | Region with oxygen introduced therein | Oxide layer thickness (nm) | Flow rate ratio (%) | S/Zn < O/Si | Thickness of region where S/Zn < 2 | Number of overwritable cycles |
| --- | --- | --- | --- | --- | --- | --- |
| 1 (comp.) | — | — | — | × | 0 | 500 |
| 2 | Interface between first dielectric layer and recording layer | 10.0 | 20 | ○ | 12.6 | 10,000 |
| 3 | Interface between second dielectric layer and recording layer | 1.0 | 10 | ○ | 11.2 | 5,000 |
| 4 | Interface between second dielectric layer and recording layer | 1.0 | 20 | ○ | 13.5 | 10,000 |
| 5 | Interface between second dielectric layer and recording layer | 1.0 | 30 | ○ | 15.0 | 10,000 |
| 6* | Interface between second dielectric layer and recording layer | 1.0 | 20 | ○ | 16.7 | 15,000 |

*In sample No. 6, oxygen was introduced throughout the recording layer.

Table 1 reveals the advantages of the invention. In the samples of the invention with oxygen introduced therein, the intensity ratio S/Zn, and the specific S/Zn<O/Si relation satisfy the ranges as defined above. Thus, these samples are much more improved in terms of the number of overwritable cycles over comparative sample No. 1 with no oxygen introduced therein.

One sample was prepared by introducing oxygen throughout the recording layer as in sample No. 6 while no oxygen was introduced in the vicinity of the interface between the second dielectric layer and the recording layer. The number of overwritable cycles was found to be 3,000 in sharp contrast to that of the sample according to the invention. Another sample was prepared by introducing oxygen throughout the second dielectric layer. The number of overwritable cycles are again found to be barely 3,000.

Figure 5:
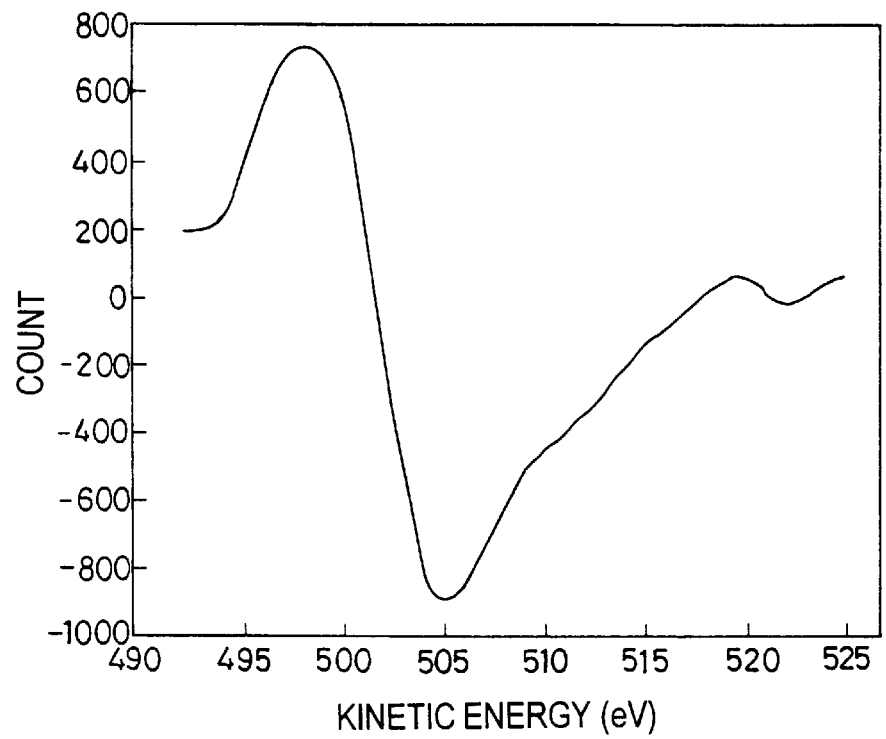
FIGS. 5(a) and 5(b) are graphs showing oxygen spectra separated by using Auger electron spectroscopy in combination with factor analysis.
Figure 5:
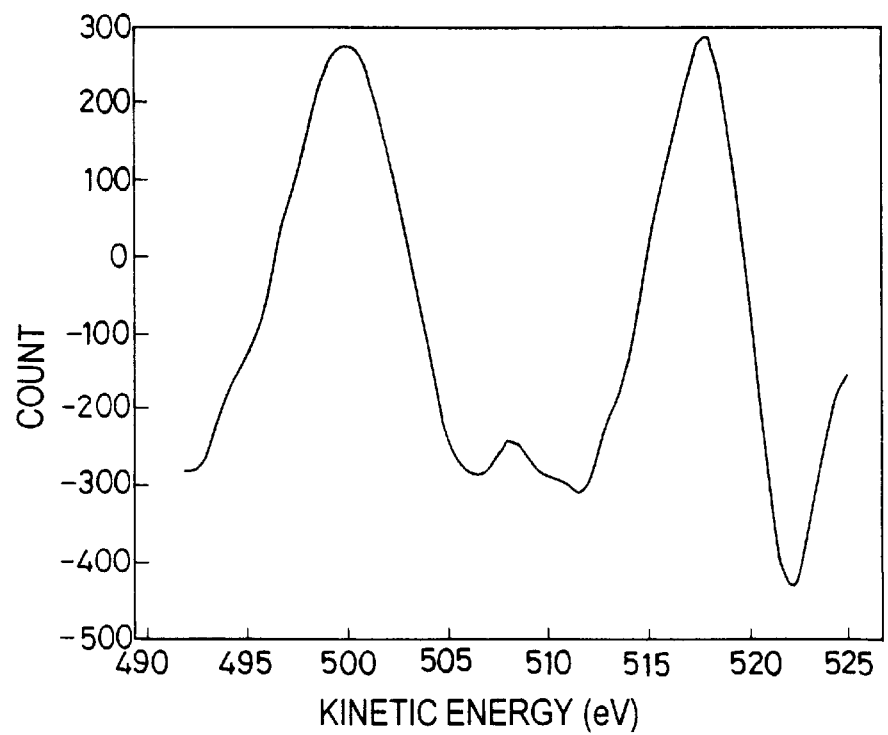

By using Auger electron spectroscopy in combination with factor analysis, Auger electron spectra of oxygen were separated into oxygen component 2 derived from the second dielectric layer and oxygen component 1 derived from the oxygen introduced in the interface. Oxygen components 2 and 1 are illustrated in FIGS. 5(a) and 5(b), respectively. Sample No. 4 was measured for the intensity distributions of both oxygen component spectra. The results are illustrated in FIG. 6.

Figure 6:
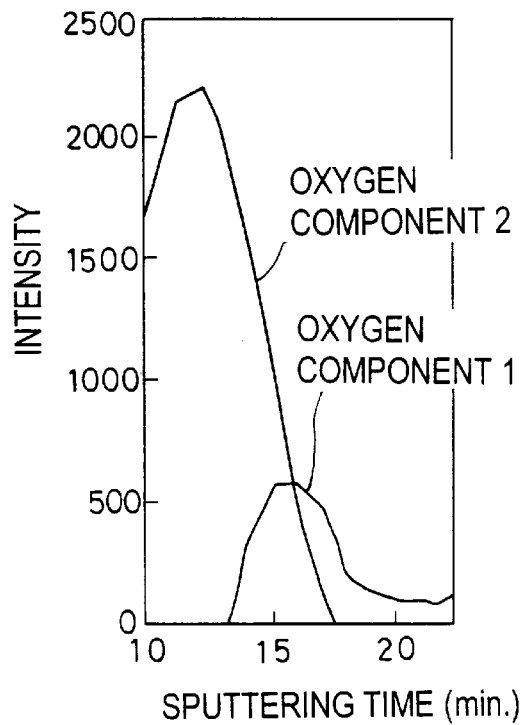
FIG. 6 is a graph showing intensity profiles of oxygen found by using Auger electron spectroscopy in combination with factor analysis, in which the distribution of oxygen from the second dielectric layer side to the recording layer is plotted.

From FIG. 6, it is found that oxygen component 1 has an interface oxygen peak, and that the ratio of the maximum intensity of said interface oxygen peak with respect to the maximum intensity of oxygen component 2 is at least 0.1. It is also found that the half-width of said interface oxygen peak is 9.2 nm calculated as $SiO_2$.

Apart from the samples shown in Table 1, a sample was prepared by forming a recording layer, and then subjecting the recording layer to a discharge treatment while an $Ar/O_2$ mixed gas was introduced at a flow rate ratio, $[O_2/(Ar+O_2)]$, of 10% to thereby introduce oxygen in the vicinity of the interface between the recording layer and the second dielectric layer. In this sample, too, an increase in the number of overwritable cycles was observed.

Example 3

An analysis sample was prepared by staking a recording layer, a dielectric layer, and a reflective layer on a glass substrate in the described order. Each layer was formed as in sample No. 5 in Table 1. However, the thickness of the recording layer was changed to 50 nm.

Figure 7:
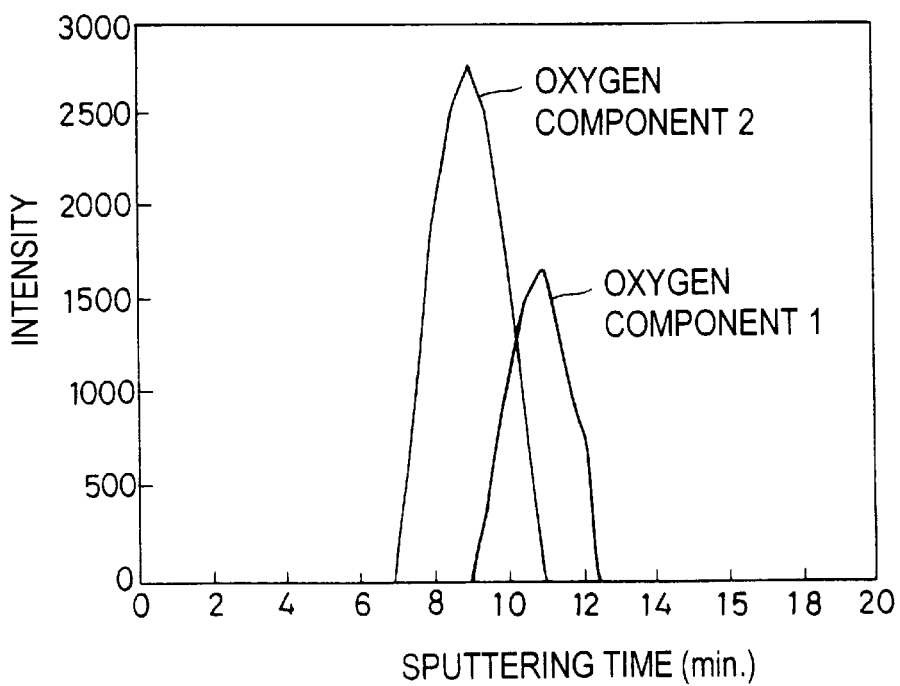
FIG. 7 is a graph showing intensity profiles of oxygen found by using Auger electron spectroscopy in combination with factor analysis, in which the distribution of oxygen from the dielectric layer to the recording layer is plotted.

This sample was analyzed by using Auger electron spectroscopy in combination with factor analysis as in Example 2. For Auger electron spectroscopy, the sputtering rate calculated as $SiO_2$ was set at 2.56 nm/min. Intensity distributions of oxygen components 1 and 2 are plotted in FIG. 7. From FIG. 7, it is found that oxygen component 1 has an interface oxygen peak, and that the ratio of the maximum intensity of said interface oxygen peak with respect to the maximum intensity of oxygen component 2 is at least 0.1. It is also found that the half-width of said interface oxygen peak is 5.8 nm calculated as $SiO_2$.

In this analysis sample, the thickness of a region with an intensity ratio S/Zn of 2 or lower was found to be at least 6 nm. Also, there was found a region where the aforesaid specific intensity ratio, S/Zn<O/Si, relation is satisfied. The thickness of this region was at least 5 nm calculated as $SiO_2$.

Japanese Patent Application No. 238911/1997 is herein incorporated by reference.

Although some preferred embodiments have been described, many modifications and variations may be made thereto in the light of the above teachings. It is therefore to be understood that within the scope of the appended claims, the invention may be practiced otherwise than as specifically described.

What we claim is:

1. An optical recording medium comprising a multilayer structure on a substrate, said multilayer structure comprising a phase change type recording layer interleaved between a pair of dielectric layers, at least one of which contains zinc sulfide, wherein:
   when a depth profile of said multilayer structure in a thickness direction thereof is found by Auger electron spectroscopy, a region having an intensity ratio S/Zn of 2 or lower exists across a thickness of at least 6.0 nm, calculated as $SiO_2$, from the vicinity of an interface between said at least one dielectric layer containing zinc sulfide and said recording layer into said recording layer.

2. An optical recording medium comprising a multilayer structure on a substrate, said multilayer structure comprising a phase change type recording layer interleaved between a pair of dielectric layers, at least one of which contains zinc sulfide and silicon oxide, wherein:
   when a depth profile of said multilayer structure in a thickness direction thereof is found by Auger electron spectroscopy, a region exists in the vicinity of an interface between said at least one dielectric layer containing zinc sulfide and silicon oxide and said recording layer, said region having an intensity ratio S/Zn vs. O/Si relation that satisfies:

S/Zn<O/Si

3. An optical recording medium comprising a multilayer structure on a substrate, said multilayer structure comprising a phase change type recording layer interleaved between a pair of dielectric layers, at least one of which contains zinc sulfide and silicon oxide, wherein:
   when oxygen spectra measured by Auger electron spectroscopy are divided by factor analysis into an oxygen component 1 derived from oxygen present on an interface between said dielectric layers and said recording layer and an oxygen component 2 derived from said silicon oxide in said dielectric layer to find a depth profile of said multilayer structure in a thickness direction thereof for each oxygen spectrum,
   a depth profile of said oxygen component 1 has a peak in the vicinity of an interface between said at least one dielectric layer containing zinc sulfide and silicon oxide and said recording layer, and
   a ratio of a maximum value for said peak of said oxygen component 1 with respect to a maximum intensity of said oxygen component 2 is at least 0.1 while a half-width of said peak of said oxygen component 1 is at least 5.5 nm, expressed in terms of thickness calculated as $SiO_2$.

4. The optical recording medium of claim 1, wherein for said Auger electron spectroscopy, an electron beam having an acceleration voltage of 5 kv, an incident electron current of 150 nA and an angle of incidence of 60 degrees is used, said angle of incidence defined by an angle between a direction of incidence of said beam on a sample and a normal of a surface of said sample, while an argon ion beam having an angle of incidence of 18.9 degrees and an acceleration voltage of 2 kv rastered in a region of 3 mm×3 mm is used as an etching beam, said angle of incidence defined by an angle between a direction of incidence of said beam on a sample and a normal of a surface of said sample.

5. A method of fabricating an optical recording medium comprising a substrate and a multilayer structure having, in order from said substrate, a first dielectric layer, a phase change type recording layer and a second dielectric layer laminated thereon, wherein:
   said first dielectric layer is first formed, and then said recording layer is formed after a discharge treatment of said first dielectric layer in an oxidizing atmosphere.

6. A method of fabricating an optical recording medium comprising a substrate and a multilayer structure having, in order from said substrate, a first dielectric layer, a phase change type recording layer and a second dielectric layer laminated thereon, wherein:
   a process of forming said first dielectric layer by a sputtering technique comprises either one of steps of:
   (a) introducing an oxygen gas into a sputtering atmosphere just before completion of formation of said first dielectric layer, and
   (b) forming said first dielectric layer while introducing an oxygen gas into a sputtering atmosphere, and increasing a concentration of said oxygen gas just before completion of the formation of said first dielectric layer.

7. A method of fabricating an optical recording medium comprising a substrate and a multilayer structure having, in order from said substrate, a first dielectric layer, a phase change type recording layer and a second dielectric layer laminated thereon, wherein:

a process of forming said second dielectric layer by a sputtering technique comprises either one of steps of:
- (a) introducing an oxygen gas into a sputtering atmosphere before, or simultaneously with, start of formation of said second dielectric layer, and interrupting the introduction of said oxygen gas just after the start of formation of said second dielectric layer, and
- (b) introducing an oxygen gas into a sputtering atmosphere before, or simultaneously with, start of formation of said second dielectric layer, and decreasing a concentration of said oxygen gas in said atmosphere just after the start of formation of said second dielectric layer.

8. A method of fabricating an optical recording medium comprising a substrate and a multilayer structure having, in order from said substrate, a first dielectric layer, a phase change type recording layer and a second dielectric layer laminated thereon, wherein:

a process of forming said recording layer by a sputtering technique comprises any one of steps of:
- (a) introducing an oxygen gas into a sputtering atmosphere before, or simultaneously with, start of formation of said recording layer, and interrupting the introduction of said oxygen gas just after the start of formation of said recording layer,
- (b) introducing an oxygen gas into a sputtering atmosphere before, or simultaneously with, start of formation of said recording layer, and decreasing a concentration of said oxygen gas in said atmosphere just after the start of formation of said recording layer,
- (c) introducing an oxygen gas into a sputtering atmosphere just before completion of formation of said recording layer, and
- (d) forming said recording layer while introducing an oxygen gas into a sputtering atmosphere, and increasing a concentration of said oxygen gas just before completion of formation of said recording layer.

9. A method of fabricating an optical recording medium comprising a substrate and a multilayer structure having, in order from said substrate, a first dielectric layer, a phase change type recording layer and a second dielectric layer laminated thereon, wherein:

said recording layer is first formed, and then said second dielectric layer is formed after a discharge treatment of said recording layer in an oxidizing atmosphere.

10. The fabrication method of claim 5, wherein at least one of said first dielectric layer and said second dielectric layer contains zinc sulfide, or zinc sulfide and silicon oxide.

* * * * *